D. C. Hall.
Curd Agitator.

Nº 91,622. Patented Jun. 22, 1869.

Witnesses:
E. Wolff
John F. Brooks

Inventor:
D. C. Hall.
pr. Munn & Co
Attorneys.

United States Patent Office.

DE WITT C. HALL, OF BARNES' CORNERS, NEW YORK.

Letters Patent No. 91,622, dated June 22, 1869.

---

IMPROVEMENT IN CURD-AGITATORS.

---

The Schedule referred to in these Letters Patent and making part of the same.

---

*To all whom it may concern:*

Be it known that I, DE WITT C. HALL, of Barnes' Corners, in the county of Lewis, and State of New York, have invented a new and improved Curd-Agitator; and I do hereby declare that the following is a full, clear, and exact description thereof, which will enable others skilled in the art to make and use the same, reference being had to the accompanying drawings, forming part of this specification.

This invention relates to improvements in apparatus for stirring curd, and separating the whey therefrom, preparatory to making cheese.

It consists of the arrangement in a vat, having a metallic or other screen near the bottom, of a sliding and rotating stirring-apparatus, whereby the curd is agitated, and the whey caused to pass off through the screen, as will be hereinafter specified.

Figure 1:
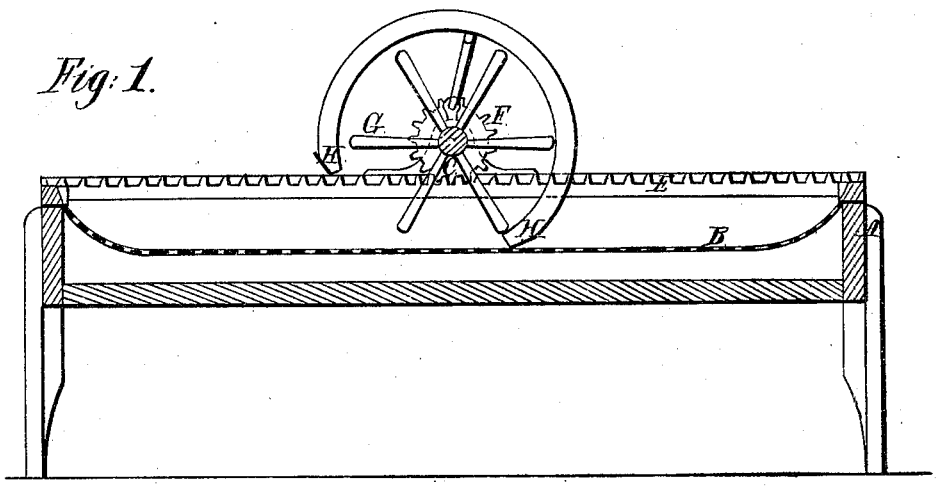
Figure 2:
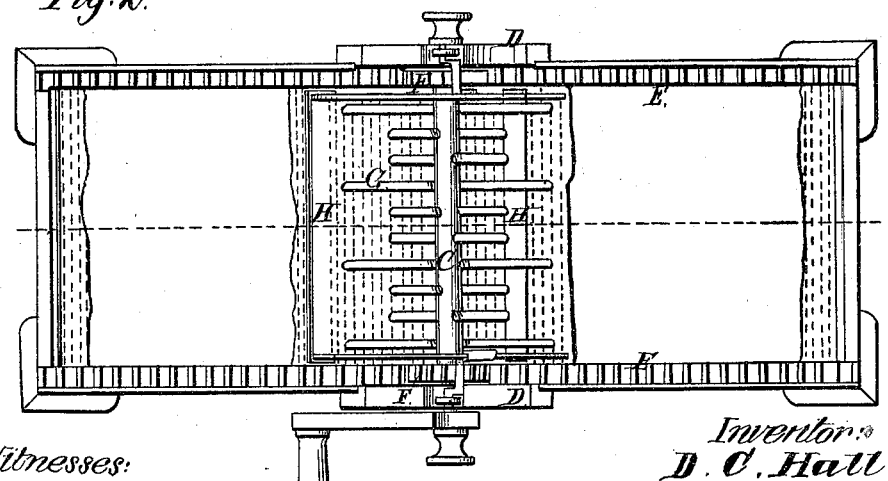

Figure 1 represents a longitudinal sectional elevation of my improved apparatus; and Figure 2 represents a plan view, showing the screen partly broken away.

Similar letters of reference indicate corresponding parts.

A represents a vat, preferably made of wood, of rectangular form, having a screen, B, arranged a short distance above the bottom, preferably made of zinc, galvanized iron, or metal which will not corrode readily.

C represents a shaft, arranged transversely upon the vat, in bearings, D, capable of sliding to and fro thereon.

E represents toothed racks, upon the top of the sides of the vat, and

F represents pinions on the shaft C, gearing into the racks.

The shaft C is provided with beaters, G, arranged spirally around it, and reaching nearly to the screen. The said beaters are considerably flattened at the ends, and the ends arranged angularly to their planes of rotation.

H represents scrapers, suspended on each side of the beater-reel, transversely of the vat, from supports pivoted to the sliding bearings D.

The curd being placed in the vat, upon the screen, motion is communicated to the beater-shaft by a hand-crank, which causes the said beaters to act on the curd, stirring it thoroughly from end to end of the vat, the rotary motion of the shaft causing it to slide also, by means of the pinions. The motion of the hand-crank is reversed when the apparatus arrives at either end.

When the beater-cylinder is moving along the vat, the following-scraper H will be drawn under the curd along the screen, and the curd will be thereby raised, to allow the whey to strain through the screen.

The supports of the scrapers may be turned in either direction by hand, at the end of the movement of the beater-cylinder, to cause the said scrapers to assume their proper position at starting into the opposite movement.

By this arrangement, the work of stirring, cooling, salting, and straining the curd may be rapidly and economically accomplished.

Having thus described my invention,

I claim as new, and desire to secure by Letters Patent—

1. The combination of the vat A, screen B, and rotary and sliding beating-arms G, substantially as specified.

2. The combination of the sliding and rotating beating-arms G and scrapers H, substantially as specified.

DE WITT C. HALL.

Witnesses:
W. H. BAKER,
JOHN HADCOCK.